United States Patent
Kroon et al.

(10) Patent No.: US 7,717,532 B2
(45) Date of Patent: May 18, 2010

(54) SYSTEMS AND METHODS THAT IMPROVE FLUID COLOR OUTPUT BY USING CLEAR OR WHITE FLUID

(75) Inventors: Stephen M. Kroon, Sherwood, OR (US); Meng Yao, West Linn, OR (US); Augustus J. Rogers, IV, West Linn, OR (US)

(73) Assignee: Xerox Corporation, Norwalk, CT (US)

( * ) Notice: Subject to any disclaimer, the term of this patent is extended or adjusted under 35 U.S.C. 154(b) by 640 days.

(21) Appl. No.: 11/275,664

(22) Filed: Jan. 23, 2006

(65) Prior Publication Data
US 2006/0250427 A1 Nov. 9, 2006

Related U.S. Application Data

(60) Provisional application No. 60/677,822, filed on May 5, 2005.

(51) Int. Cl.
*B41J 2/205* (2006.01)

(52) U.S. Cl. .................................. 347/15; 347/43; 347/9

(58) Field of Classification Search ............ 347/15, 347/43, 9
See application file for complete search history.

(56) References Cited

U.S. PATENT DOCUMENTS

| 5,997,132 | A | * | 12/1999 | Smith et al. ............. 347/43 |
| 6,027,196 | A | * | 2/2000 | Gotoh et al. ............ 347/7 |
| 6,250,733 | B1 | * | 6/2001 | Yao et al. ............... 347/15 |
| 2003/0173406 | A1 | * | 9/2003 | Bi et al. ................. 235/491 |

* cited by examiner

*Primary Examiner*—Matthew Luu
*Assistant Examiner*—Henok Legesse
(74) *Attorney, Agent, or Firm*—Oliff & Berridge PLC

(57) ABSTRACT

An imaging system that forms an image on a receiving medium including a fluid ejector that ejects fluid onto the receiving medium and a controller that controls the fluid ejector to eject the fluid to include a non-white and non-clear fluid or one of at least white and clear W fluid on each pixel on the receiving medium. A substantially single layer of fluid is ejected onto the receiving medium. A method for forming an image on a receiving medium includes ejecting a fluid onto the receiving medium, and controlling the ejection of the fluid to include a non-white and non-clear fluid or one of at least white and clear fluid for each pixel on the receiving medium.

3 Claims, 5 Drawing Sheets

SYSTEMS AND METHODS THAT IMPROVE FLUID COLOR OUTPUT BY USING CLEAR OR WHITE FLUID

This application claims priority of provisional application No. 60/677,822 entitled "Systems and Methods that Improve Fluid Color Output by Using Clear or White Fluid" filed May 5, 2005 by Stephen M. Kroon et al., the entire disclosure of which is hereby incorporated by reference herein in its entirety.

BACKGROUND

When printing a image, solid or phase change inks that are solid at ambient temperatures and liquid at elevated operating temperatures are currently utilized in conventional printers. The printers eject fluid, e.g., liquid phase ink droplets from the print head, at an elevated operating temperature. The droplets solidify quickly upon contact with the surface of a receiving medium to form a predetermined pattern or image.

When forming an image on a medium, e.g., printing on a piece of paper by forming an image on a drum and transferring the image to paper. Printing is typically performed using Cyan, Magenta, Yellow, and Black ink (CMYK). where any combination of these four printer primary ink colors may be marked at any pixel location. The number of ink colors a printer uses is also referred to as the printer's number of color channels.

The quality of the image is generally limited by the drop size that the printer can produce. The drop size of the fluid and dot gain is usually a limiting factor determining the maximum practical addressability of a printer. With conventional CMYK printing systems, dots of secondary colors are usually printed with twice the ink of primary colors. Thus, because more ink is printed with secondary colors, more dot gain may occur when printing a secondary color than when printing a primary color. Furthermore, dot gain from the printed secondary colors spilling into adjacent unoccupied paper white areas may cause problems with the printed image.

One method of reducing dot gain ejects clear or white ink on unoccupied white areas next to printed non-white pixels. However, this method does not address problems associated with each marked pixel receiving a different amount of fluid which contributes to non-uniform dot gain. If the dot gain is significantly reduced, then much higher resolutions of an image may be possible in the final printed product.

SUMMARY

Based on the problems discussed above, systems and methods are provided that improve fluid color output by using clear or white (W) fluid in addition to or in place of black (K) fluid normally used in the print process.

An embodiment may include an imaging system that forms an image on a receiving medium that may include a fluid ejector that ejects fluid onto the receiving medium and a controller that controls the fluid ejector to eject the fluid to include a non-white and non-clear printer primary fluid or one of at least white and clear W fluid on each pixel on the receiving medium. A single layer of fluid may be ejected onto the receiving medium.

A method for forming an image on a receiving medium may include ejecting a fluid onto the receiving medium, and controlling the ejection of the fluid to include a non-white and non-clear printer primary fluid or one of at least white and clear fluid for each pixel on the receiving medium.

Various exemplary embodiments may significantly reduce dot gain by controlling the fluid ejection to be a similar amount for each pixel so that an image with a better resolution can be formed.

In various exemplary embodiments, the systems and methods may eject fluid, e.g., solid ink colors, along with clear or white ink using a uniform layer of ink at most pixel locations. In one embodiment, a CMYK input signal with pixel coverage from zero to 400 percent may be converted to a CMYW signal with 100 percent coverage for all pixels. The uniform 100 percent coverage CMYW signal may be accomplished using a dithering method to place a single layer of ink drops.

In various exemplary embodiments, the systems and methods may improve output quality by reducing dot gain, resulting in a higher resolution and more uniform ink coverage.

The various image processing methods may be used to form an image on a receiving medium by processing each pixel to be printed using a color conversion and halftoning process.

BRIEF DESCRIPTION OF THE DRAWINGS

Various exemplary embodiments of the systems and methods according to the disclosure will be described in detail, with reference to the following figures, wherein.

DETAILED DESCRIPTION OF PREFERRED EMBODIMENTS

Figure 1:
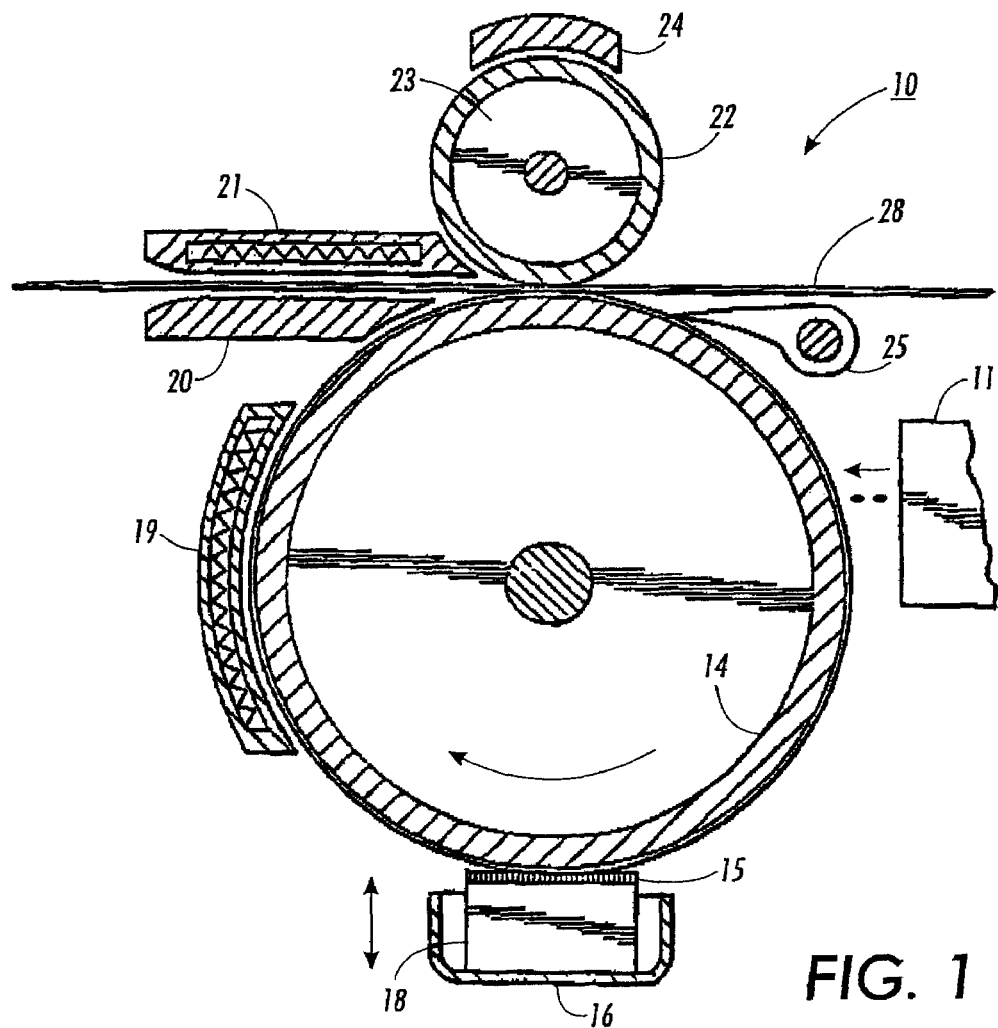
FIG. 1 is an exemplary diagram of an imaging system.

While the embodiments discussed below use clear or white (W) fluid in place of or in addition to black (K) fluid used in the CMYK print process, the CMYK process is used in the discussion for exemplary purposes only. It should be appreciated by one skilled in the art that clear or white fluid may be used in conjunction with any known ink colors or number of color channels without departing from the spirit and scope of the disclosure. FIG. 1 discloses an imaging system 10. For reasons of convenience, a printing system using a drum and ink (as the fluid) will be described in the detailed description. However, it should be appreciated by one skilled in the art that any known imaging system and imaging fluid may be used without departing from the spirit and scope of the disclosure.

Figure 6:
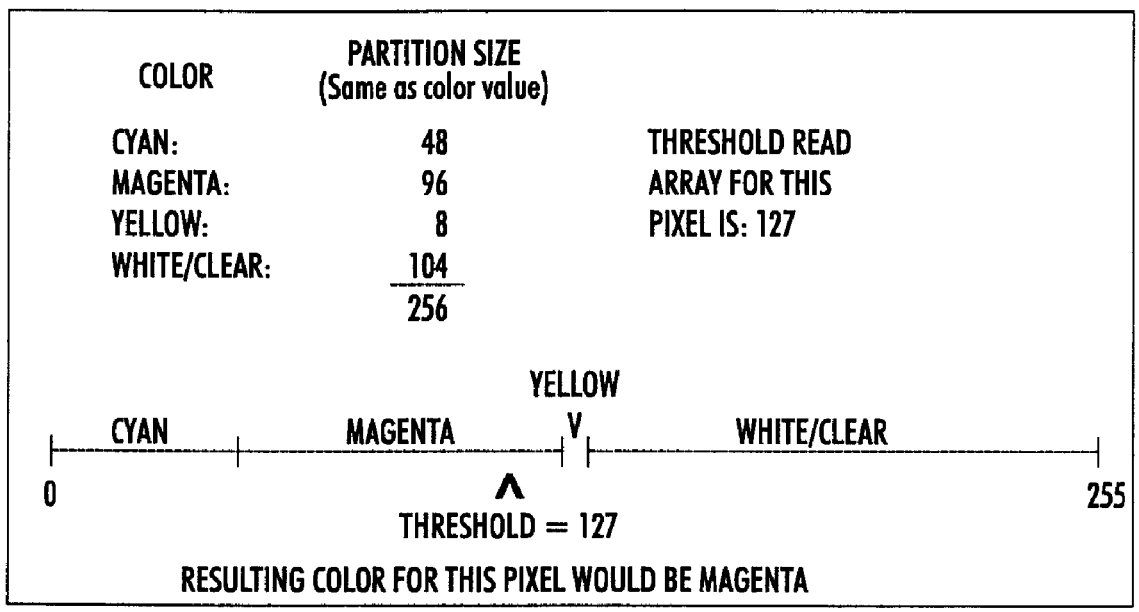
FIG. 6 shows an exemplary diagram of a maximally non-aligned halftoning process that may be used to select a pixels fluid color given the results of a coverage limiting color conversion process such as the examples in FIG. 7 and FIG. 8.
Figure 7:
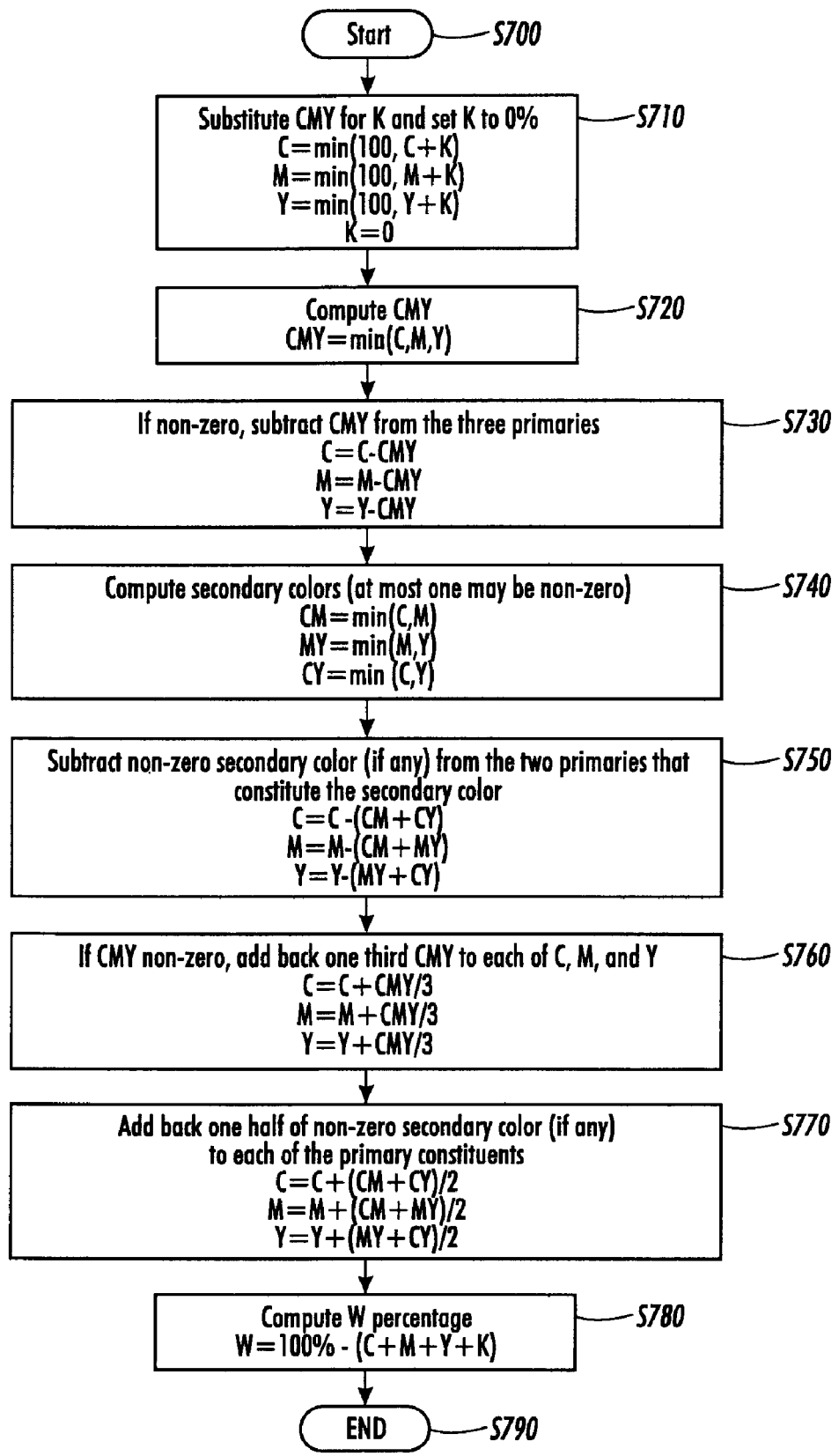
FIG. 7 is an exemplary flowchart showing a color conversion process from a CMYK input signal ranging from 0 to 400% to a CMYW 100% output signal, which, once halftoned using the methods of FIG. 6, will be appropriate for a four channel printer capable of printing at least one of C, M, Y, or W ink at each pixel location.
Figure 8:
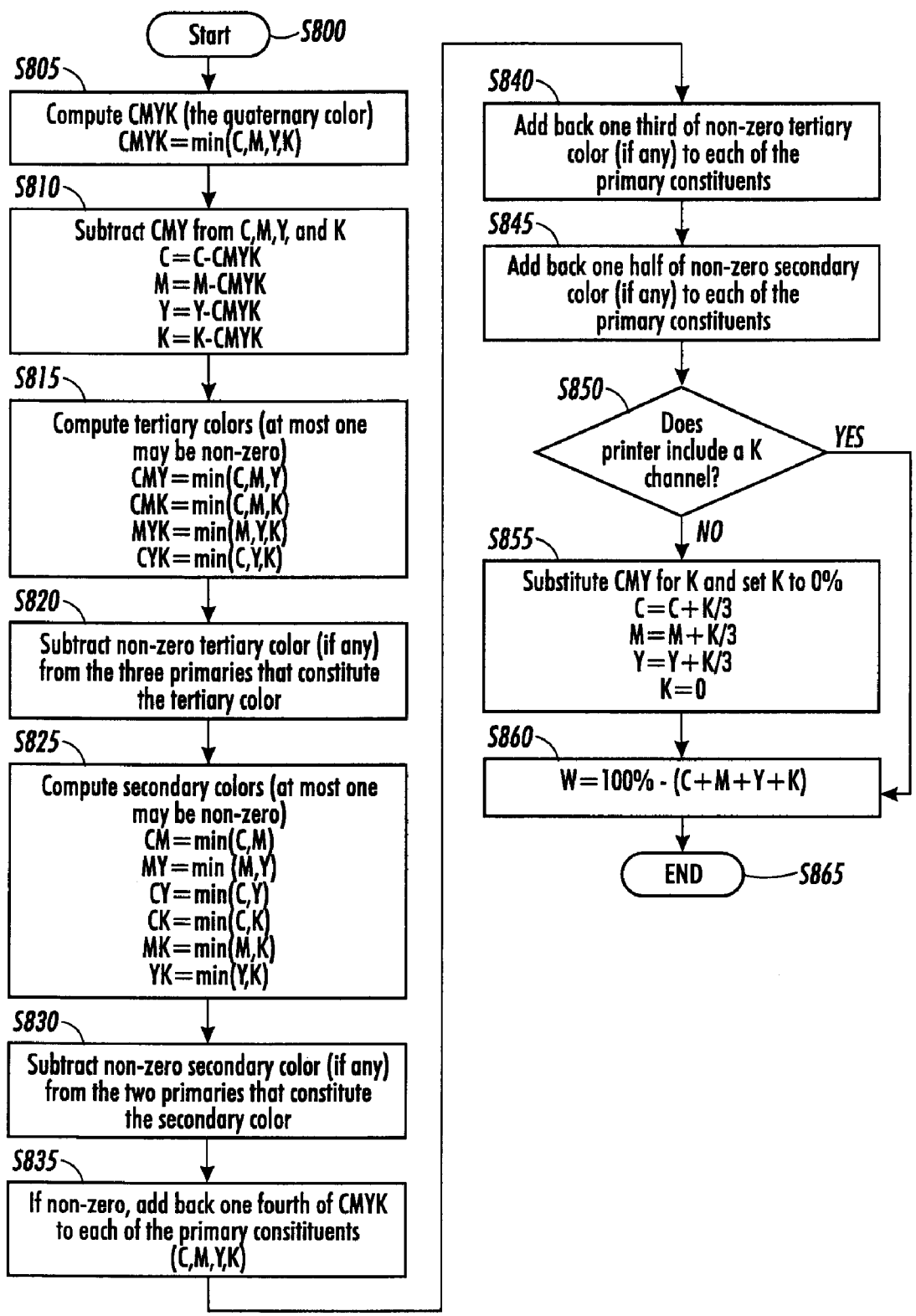
FIG. 8 is an exemplary flowchart showing another color conversion process that may be used to produce a 100% four or five channel output signal for a four channel printer capable of printing CMYW or a five channel printer capable of printing CMYKW.

In various exemplary embodiments, an imaging system may receive a request to form an image on a receiving medium. After a CMYK print signal has been converted to a CMYW or CMYKW print signal as shown in FIG. 7 and FIG. 8, and halftoned as depicted in FIG. 6, the image may be formed or printed on a receiving medium such as paper using the printing system shown in FIG. 1. As shown in FIG. 1, a print head 11 may be supported by a housing and support elements (not shown) to place a fluid, e.g., an ink in the liquid of molten state, on the transfer surface 12 shown in FIGS. 2 and 3. The print head 11 may function as a fluid ejector. The transfer surface 12 may be a liquid layer that is applied to a supporting surface 14, which is shown in these examples as a drum. It should be appreciated by one skilled in the art that the supporting surface may also be web, platen or any other suitable design without departing from the spirit and scope of the disclosure. The liquid layer may be applied, for example, by contact with an applicator, such as a metering blade, roller, web or a wicking pad 15 contained within an applicator assembly 16. The supporting surface 14 may be formed from any appropriate material, for example, such as metals including aluminum, nickel or iron phosphate, elastomers including fluoroelastomers, perfluoroelastomers, silicon rubber and polybutadiene, plastics including polytetrafluoroethylene loaded with polyphenylene sulfide, thermal plastic such as polyethylene, nylon and FEP, thermal sets such as acetals or ceramics.

Figure 2:
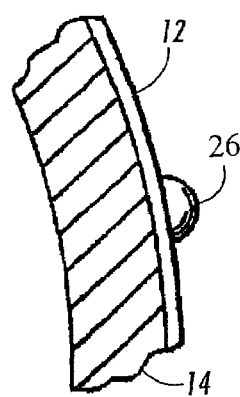
FIG. 2 is an exemplary diagram showing a liquid layer of FIG. 1.

Any appropriate material could be used for the supporting surface 14 as long as the exposed surface is sufficiently rigid to deform the transferred image-forming fluid 26 when the receiving medium 28 passes between it and the transfer/fixing roller 22, and it is sufficiently smooth so as not to interfere with the ability of the transfer surface 12 or liquid layer to support the image-forming fluid 26 shown in FIG. 2.

An applicator assembly 16 may optionally contain a reservoir and wicking pad 15 for the liquid and may also contain an advancing mechanism (not shown) to periodically present fresh web full contact with the supporting surface 14. The wicking pad 15 or the web may be any appropriate non-woven synthetic textile with a relatively smooth surface. The web may be a polyester material. The systems and methods may employ a smooth wicking pad 15 mounted atop a porous supporting material 18 such as a polyester felt. An applicator apparatus 16 may be mounted for retractable movement upward in contact with the surface of the supporting surface 14 and downwardly out of contact with the surface of the supporting surface 14. The liquid layer 12 may be applied by using an appropriate mechanism such as an air cylinder or an electrically actuated solenoid.

FIG. 1 also shows a final substrate guide 20 that may pass the receiving medium 28, such as paper, from a positive feed device (not shown) and guides the receiving medium 28 through the nip formed by opposing surfaces of the roller 22 and the transfer surface 12 supported by the supporting surface 14. Stripper fingers 25 may be pivotally mounted on the imaging apparatus 10 to assist in removing any paper or other final receiving substrate media from the exposed surface of the liquid layer forming the transfer surface 12. The roller 22 may have a metallic core, preferably steel with an elastomeric covering. A suitable elastomeric covering may include silicons, urethanes, nitrites, EPDM and other appropriate resilient materials. The elastomeric covering on the roller 22 may engage the receiving medium 28 on the reverse side to which the fluid 26 is transferred from the exposed surface of the liquid layer forming the transfer surface 12. This process may fuse or fix the fluid 26 to the surface of the receiving medium 28 so that the fluid is spread, flattened and adhered.

A fluid ejector, such as a print head, ejects solid or phase change inks that are solid at ambient temperatures and liquid at elevated operating temperatures. The ejected fluid may be initially in solid form and then may be changed to a molten state by an application of heat energy to raise the temperature, for example, to approximately 85° C.-150° C. For example, the ejected fluid may be molten ink applied in raster fashion from the inkjets in the print head 11 to the exposed surface of the liquid layer forming the transfer surface 12 where it is cooled to an intermediate temperature and solidifies to a malleable state in which it is transferred to the receiving medium 28 via contact transfer by entering the nip between the roller 22 and the liquid layer forming the transfer surface 12 on the supporting surface 14.

Once the solid malleable fluid enters the nip, it may be deformed to a final image confirmation and adhered or fixed to the receiving medium either by pressure exerted against the fluid on the receiving medium 28 or by the roller 22 alone, or by the combination of the pressure and heat supplied by the heater 21 and/or heater 19. A heater 24 may also be employed to supply heat to facilitate the process at this point. Pressure may have to be exerted on the image-forming fluid 26 to adhere the image-forming fluid 26 to the receiving medium 28 and to be sufficiently deformed to ensure that the light is transmitted through the final image without deviation in its path from the inlet to the outlet, in those instances when the receiving medium is a transparency. Once adhered to the receiving medium 28, the ink image may then be cooled. The fluid used in the system should be ductile, or be able to yield or experience plastic deformation without fracture when kept at a temperature above the glass transition temperature.

Figure 3:
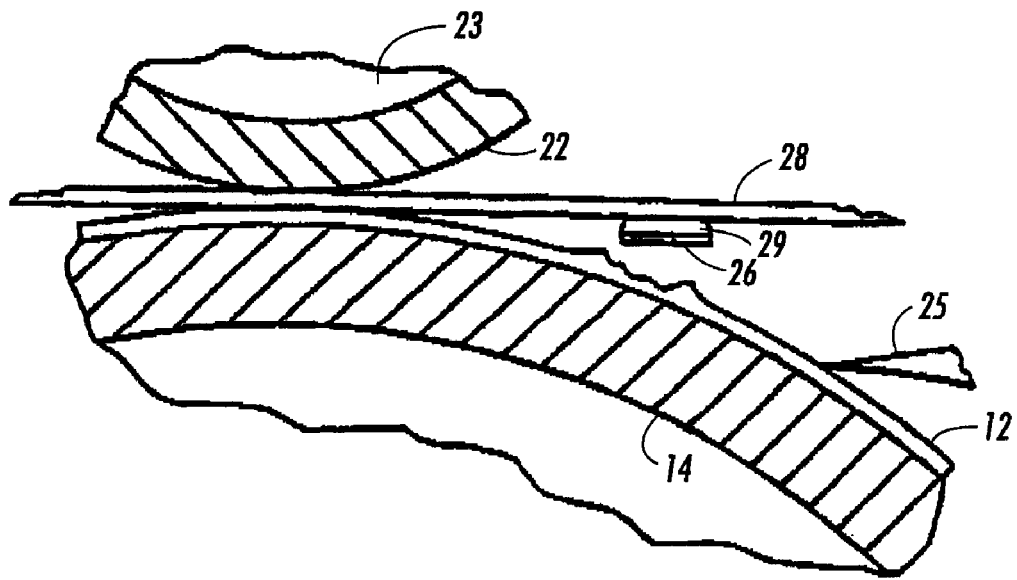
FIG. 3 is an exemplary diagram showing the transfer of an image.

FIG. 3 is an exemplary diagram showing the sequence involved when an image-forming fluid 26 is transferred from the liquid layer forming the intermediate transfer surface 12 to the receiving medium 28. As shown in FIG. 3, the image-forming fluid 26 transfers to the receiving medium 28, with a small, but measurable quantity of the fluid on transfer surface 12 attached thereto as an outer layer 29. Some appropriately small and finite quantity of the fluid in the liquid layer forming the transfer surface 12 may also be transferred to the receiving medium 28 in areas adjacent to the transferred image-forming fluid 26. This relatively small transfer of the liquid from the transfer surface 12 with the image-forming fluid 26 and to the non-imaged areas on the receiving medium 28 may permit multiple pages of the receiving medium 28 to be imaged before it is necessary to replenish the sacrificial liquid layer forming the transfer surface 12. The replenishment may be desired after each final image copy, depending on the quality and nature of the final receiving surface that is utilized. Transparencies and paper may be used as the receiving medium for a received image. Suitable liquids that may be employed as the transfer surface 12 include water, fluorinated oils, glycol, surfactants, mineral oil, silicon oil, functional oils or combinations thereof. Functional oils may include mercapto-silicon oils, fluorinated silicon oils and the like.

The liquid layer that forms the transfer surface 12 on the surface of the supporting surface 14 may be heated by an appropriate heater device 19. The heater device 19 may be a radiant resistance heater positioned as shown or positioned internally within the supporting surface 14. The heater devices 21 and 24 may also be positioned on the final substrate guide 20 and in the roller 22. The heater device 19 may increase a temperature of the transfer surface 12. The heater 21 may preheat the receiving medium 28 prior to the fixation of the final image. The heater 24 may heat the roller 22 and may also be positioned internally with roller 22.

The fluid used to form the image-forming fluid 26 may have suitable properties for viscosity. Initially, the viscosity of the molten fluid should be matched to the requirements of the inkjet device utilized to apply it to the transfer surface 12 and optimized relative to other physical and rheological properties of the fluid as a solid, such as yield strength, hardness, elastic modulus, lost modulus, ratio of the lost modulus to the elastic modulus and ductility.

Figure 4:
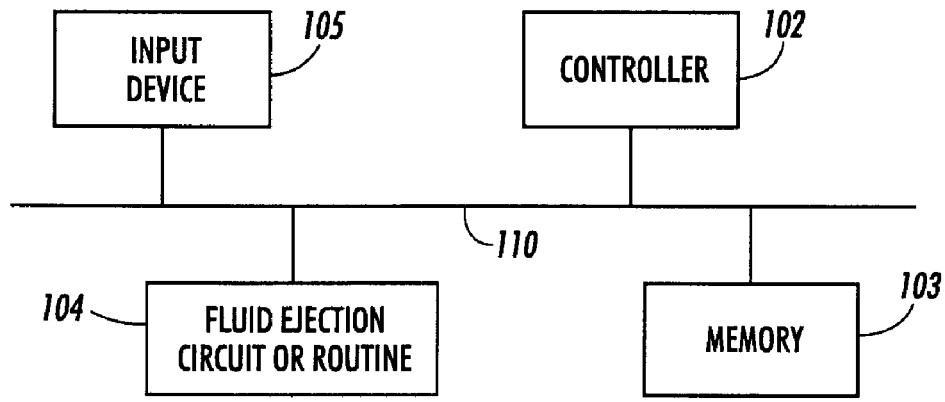
FIG. 4 is an exemplary block diagram illustrating the circuitry for the imaging system.

FIG. 4 is an exemplary block diagram illustrating the circuitry for the imaging system. As shown in FIG. 4, the circuitry 100 may include a controller 102, a memory 103, a fluid ejection circuit or routine 104 and an input device 105. The components 102-105 may all be connected via a common bus 110. It should be appreciated by one skilled in the art that the components 102-105 are exemplary only, and that more or less components may be used without departing from the spirit and scope of the disclosure. The controller 102 may be used to control the ejection of fluid on the receiving medium using the fluid ejection circuit or routine 104. In the illustrated embodiment, the controller 102 is implemented with general purpose processors. However, it will be appreciated by those skilled in the art that the controller 102 may be implemented using a single special purpose integrated circuit (e.g., ASIC) having a main or central processor section for overall, system-level control, and separate sections dedicated to performing various different specific computations, functions and other processes under control of the central processor section.

The controller 102 may be a plurality of separate dedicated or programmable integrated or other electronic circuits or devices (e.g., hardwired electronic or logic circuits such as discrete element circuits, or programmable logic devices such as PLDs, PLAs, PALs or the like). The controller 102 may be suitably programmed for use with a general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller 102. A distributed processing architecture can be used for maximum data/signal processing capability and speed.

Figure 5:
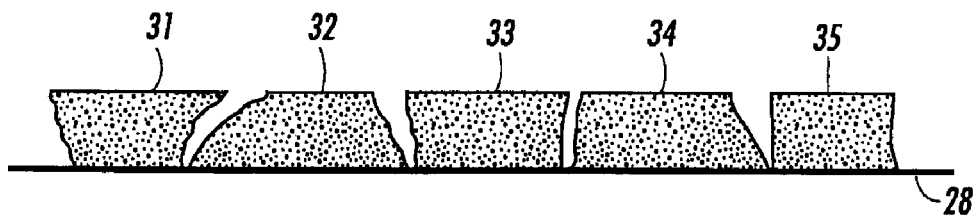
FIG. 5 is an exemplary diagram showing the bordering of pixel locations and fluid drops.

FIG. 5 is an exemplary diagram showing the bordering of pixel locations and fluid drops. As shown in FIG. 5, and in accordance with various exemplary embodiments, a single layer of ejected fluid drops 31-35 are placed on pixel locations on the receiving medium 28 in order to form an image. This application of ink to the page differs from conventional methods. Conventionally, each pixel location might be marked with zero, one, two, three, four or N drops of ink where N is the number of color channels supported by the printer. As FIG. 5 suggests, the current invention will print using predominantly a single layer of ink independent of the number of color channels supported by the printer.

In accordance with various exemplary embodiments and depicted in FIG. 7 and FIG. 8, a color conversion process may be used that converts colors on a per pixel basis from a 0 to 400% CMYK coverage to a 100% CMYW or CMYKW coverage for all pixels. The 100% or uniform coverage CMYW or CMYKW signal makes it simpler to form a single layer of fluid or ink on the receiving medium. The various systems and methods may print a printer resolution image as a process run on each pixel to be printed using two steps: a) color conversion to limit total coverage to 100%; followed by b) a maximally non-aligned halftoning step designed to minimize drop overprint.

Color Conversion

The embodiment of the color conversion process described here corresponds to the process depicted in FIG. 7. The color conversion process may convert colors on a per pixel basis from up to 400% CMYK pixel coverage to 100% CMYW coverage. Examples are expressed in pseudo code. The symbol "=" is an assignment operator: the value of the right operand is stored into the left operand. The formulas represent sequences of procedural steps successively modifying the values of variables. For reasons of convenience, the following variable and function definitions will be used in the examples:

Along with addition subtraction and division, these functions are used in the color conversion procedures:

min (a, b): minimum of a and b;

max (a, b): maximum of a and b.

The following five variables represent ink percentages correspond to C, M, Y, K, and W printer color channels. At the end of the color conversion, these values will total 100%. After conversion, these values are used as input to the halftoning process.

c: cyan;
m; magenta;
y; yellow:
k; black;
w; white or clear;

The following variables are used only to facilitate calculation and are not subsequently used.

my: red;
cy: green;
cm: black;
ck: cyan black:
mk: magenta black:
yk: yellow black:
cmy: composite black;
myk: red black;
cyk: green black;
cmk: blue black;
cmyk: super composite black The color conversion process is as follows:

Substitute equal parts c, m, and y for k and set k to 0. In practice, the amounts of c, m, and y added would be adjusted to preserve printer specific color balance and lightness as much as possible.

$c=\min(100, c+k)$;

$m=\min(100, m+k)$;

$y=\min(100, y+k)$;

$k=0$.

Compute cmy component and reduce c, m, and y by cmy $cmy=\min(c, \min(m. y))$;

$c=c-cmy$;

$m=m-cmy$;

$y=y-cmy$.

Compute secondary colors (at most one may be non-zero)

$cm=\min(c, m)$;

$my=\min(m, y)$;

$cy=\min(c, y)$;

Subtract non-zero secondary color (if any) from the two primaries that constitute the secondary color.

$$c=c-(cy+cm);$$

$$m=m-(my+cm);$$

$$y=y-(my+cy);$$

Add tertiary color components:

$$c=c+cmy/3;$$

$$m=m+cmy/3;$$

$$y=y+cmy/3.$$

Add back one half of non-zero secondary color components to the primary colors that include them.

$$c=c+cy/2+cm/2;$$

$$m=m+my/2+cm/2;$$

$$y=y+my/2+cy/2.$$

Compute w so that the total c+m+y+w is 100%.

$$w=100-(c+m+y).$$

At this point the percentage values of c, m, y and w may be used as input to the halftoning step.

As a result of this process, for any combination of input values, c, m, y and k whose total may range from 0 to 400%, the resulting sum (c+m+y+k) will be a constant 100% for all input CMYK values.

In the example discussed above, "100" is used to indicate percentage. Alternatively, "255" may be used in a bit map conversion process to obtain a constant 100% for all input CMYK values.

Halftoning

A dithering process may be performed to determine which one of the C, M, Y or W color fluids will be ejected at each pixel location. Because one drop of fluid should be placed at each pixel location, a non-aligned halftone method may be required. This non-aligned halftone method may use "vector halftoning" to provide maximum non-alignment and to allow good performance. Vector halftoning may be used to determine an ink overlap for secondary colors. However, in the example provided above, the secondary colors were removed. Thus, all that is required is a modification of the thresholding step used in vector halftoning. This modified step is discussed below.

For each pixel, there may be a color vector (CMYW) as computed above where c+m+y+w equals 100%. These values, together with the halftone threshold value for the current pixel, may be used by the controller 102 to determine what color of fluid (Cyan, Magenta, Yellow or White/Clear) to eject on the receiving medium at a location representing the current pixel. This process may be performed by first partitioning a range of possible color values (0-255) into four partitions representing the four possible fluid colors to be ejected (CMYW) and then making each partition the size of the color value computed. As shown in FIG. 6, the partitions for the CMYW colors are 48, 96, 8 and 104 respectively. Then, using a single halftone threshold array with threshold values from 0-255, the color assigned to the partition containing the threshold value is selected for ejection. The halftone threshold array is a two dimensional array of values from 0 to 100%. Any known halftoning method may be used without departing from the spirit and scope of the disclosure. For example, a method of halftoning that may be used is disclosed in U.S. Pat. No. 6,250,733, which is hereby incorporated in its entirety by reference. The halftoning method includes operating a printing system that can print any of several different colors onto a point on a sheet of printer media using a halftoning process, along with image data having a matrix of image data elements. Although a single layer of ejecting fluid may be preferred, multiple layers of fluid may be ejected onto the receiving medium without departing from the spirit and scope of the disclosure.

FIG. 6 shows an exemplary diagram showing the process used to select a fluid color to be ejected for a particular pixel at a location on the page where the halftone screen's threshold value is 127 of 255. Since threshold values in the halftone threshold array are uniformly distributed from 0-255, the probability of any one of the four possible fluid colors being used to color a pixel is equal to the size of the partition associated with the color for that pixel as a fraction of 256. As shown in FIG. 6, a resulting color of fluid ejected for the exemplary pixel would be Magenta.

FIG. 7 is an exemplary flowchart showing a method of printing. As shown in FIG. 7, the method starts at step S700, where each of the c, m, y, k colors has a percentage of 100% and thus the total percentage could reach 400%.

As shown in FIG. 7, the method for reducing the total percentage proceeds from step S700 to step S710, where the method substitutes cmy for k and sets k to 0 percentage. Next, at step S720, the method computes cmy. Then, the method proceeds to step S730.

At step S730, the method subtracts cmy from the three primary colors, if cmy is not zero. Then, at step S740, the method computes secondary colors.

Next, at step S750, the method subtracts non-zero secondary color from the two primary colors that constitute the secondary color. Subsequently at step S760, the method adds back one-third of cmy to each of c, m and y, if cmy is not 0.

Next, at step S770, the method adds back one-half of non-zero secondary color, if any, to each of the primary constituents. Then, at step S780, the method computes the percentage of white. Subsequently, the method proceeds to step S790, where the method ends. As a result, for any combination of input values, cmy and k whose total may range from 0 to 400%, the resulting sum (c+m+y+w) will be a constant 100%.

FIG. 8 is an exemplary flowchart showing another method of printing. As shown in FIG. 8, the method starts at step S800 where each of the c, m, y, k colors has a percentage of 100% and thus the total percentage could reach 400%. The method proceeds from step S800 to step S805, where the method computes the quaternary color cmyk. Then, at step 810 the method subtracts cmyk from cmy and k.

Next, at step S815, the method computes tertiary colors. Then, at step S820, the method subtracts non-zero tertiary color, if any, from the three primary colors.

Next, at step S825, the method computes secondary colors. Then, at step S830, the method subtracts non-zero secondary color, if any, from the two primary colors that constitute the secondary color.

Subsequently, at step S835, the method adds back one-fourth of cmyk to each of its primary constituents (c, m, y, k), if cmyk is not zero. Then, at step 840, the method adds back one-third of non-zero tertiary color, if any, to each of the primary constituents. Thereafter, the method adds back one-half of non-zero secondary color, if any, to each of its primary constituents.

Next, at step S850, a determination is made whether a printer includes a K channel. If it is determined at step S850 that the printer includes a K channel, the method jumps to step S860. On the other hand, if it is determined at step S850 that the printer does not include a K channel, the method substitutes cmy for k and sets k to 0%. Thereafter, the method proceeds to step S860.

At step S860, the percentage of white color W is calculated. Thereafter, the method proceeds to step S865, where the method ends. As a result, for any combination of input values, cmy and k whose total may range from 0 to 400%, the resulting sum will be a constant 100%.

The methods illustrated in FIGS. 7 and 8 may be implemented in a computer program product that can be executed on a computer. The computer program product may be a computer-readable recording medium on which a control program is recorded, or it may be a transmittable carrier wave in which the control program is embodied as a data signal.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. An imaging system that forms an image on a receiving medium, comprising:
    a fluid ejector that ejects fluid onto the receiving medium, the fluid ejector being a print head that ejects solid or phase change inks that are solid at ambient temperatures and liquid at elevated operating temperatures;
    a fluid ejection circuit that drives the fluid ejector; and
    a controller that controls the fluid ejector to eject the fluid to include a non-white and non-clear fluid or one of at least white or clear W fluid on each pixel on the receiving medium, the controller controlling the fluid ejection circuit or routine to convert a cyan (C), magenta (M), yellow (Y) and black (K) signal with pixel coverage from zero to 400 percent to a cyan, magenta and yellow signal with 100 percent coverage for all pixels,
    wherein the fluid ejector ejects substantially a single layer of fluid onto the receiving medium, and
    the controller controlling the fluid ejection circuit to perform the conversion by:
    substituting c, m, y for k and setting k to zero by calculating $c=\min(100, c+k)$, $m=\min(100, m+k)$, $y=\min(100, y+k)$, $k=0$;

computing cmy component by $cmy=\min(c, m, y)$;
    reducing c, m, and y by $c=c-cmy$;

$m=m-cmy$;

$y=y-cmy$;

computing and subtracting secondary color components (my, cy, cm) from c, m and y using $cm=\min(c, m)$, $my=\min(m, y)$, $cy=\min(c, y)$, $c=c-(cy+cm)$, $m=m-(my+cm)$, $y=y-(my+cy)$, adding one third tertiary color components using $c=c+cmy/3$, $m=m+cmy/3$, $y=y+cmy/3$;

adding one half of secondary color components (my, cy, cm) to c, m and y using $c=c+cy/2+cm/2$, $m=m+my/2+cm/2$, $y=y+my/2+cy/2$; and computing white as $w=100-(c+m+y)$.

2. The imaging system of claim 1, the controller controlling the fluid ejection circuit or routine to perform a dithering process for halftoning.

3. A xerographic marking device including the imaging system of claim 1.

* * * * *